United States Patent Office 2,802,811
Patented Aug. 13, 1957

2,802,811

CHLOROPRENE STABILIZED WITH A MIXTURE OF ZINC DIMETHYL DITHIOCARBAMATE AND THE ZINC SALT OF MERCAPTOBENZOTHIAZOLE

Albert A. Somerville, Carmel, N. Y., and Wilbur S. Taylor, Norwalk, Conn., assignors to R. T. Vanderbilt Company, Inc., New York, N. Y., a corporation of New York No Drawing. Application November 2, 1953, Serial No. 389,890

2 Claims. (Cl. 260—45.75)

Our invention relates to the vulcanization of chloroprene or polymerized 2-chlorobutadiene-1,3 to provide a product of increased resistance to fungus attack.

It is well recognized that the chloroprene coverings which are commonly used in the manufacture of wire and cable are subject to attack by microorganisms. These organisms attack materials employed in the compounding of the chloroprene. Bacteria, molds and yeasts, most commonly molds, cause the most trouble and damage. The microorganisms occur universally and are capable of utilizing as nutrients various constituents employed in the rubber compounding. The organisms cause trouble by growing on the surface of the chloroprene rubber and affecting its physical properties, or by actually consuming individual constituents of the rubber and thereby altering the rubber composition.

In general, there are two recognized ways for preventing the growth of the microorganisms and the damage which they cause. The first way involves the use of inert materials which are not susceptible to the growth of microorganisms, and the second involves the use of small amounts of specific chemicals which serve as fungicides and by their action prevent the growth of the microorganisms by killing them or preventing their reproduction.

In accordance with our present invention we have devised a method whereby chloroprene rubber can be vulcanized to provide a product which is highly resistant to fungus attack and therefore fills a distinct need in the art. In general, the method which we have devised involves vulcanizing the chloroprene under the usual conditions heretofore employed and while it has in admixture with it materials conventionally employed in the rubber compounding art, such as accelerators, antioxidants and the like. As a departure from the prior art practice, however, the method of our invention requires that during the vulcanization the chloroprene have in admixture with it a small amount of a mixture of zinc dimethyl dithiocarbamate and the zinc salt of 2-mercaptobenzothiazole. The use of the mixture of zinc dimethyl dithiocarbamate and the zinc salt of 2-mercaptobenzothiazole does not affect the rate of vulcanization, that is, the rate of vulcanization obtained using the mixture of the two zinc compounds is substantially the same as that obtained when such mixture is not employed. At the same time, however, the use of the mixture of zinc dimethyl dithiocarbamate and the zinc salt of 2-mercaptobenzothiazole results in the production of a final vulcanized product having an unexpected degree of resistance to fungus attack.

The following example illustrates in detail one specific embodiment falling within the scope of our invention.

EXAMPLE

Chloroprene rubber was vulcanized in accordance with the following formula, the parts being by weight: Neoprene GN (a chloroprene polymer stabilized by a thiuram disulfide instead of a discoloring type antioxidant), 100 parts; Altax (a proprietary benzothiazyl disulfide rubber accelerator), 1.5 parts; stearic acid, 3.0 parts; paraffin, 8.0 parts; Circo light oil (a proprietary petroleum derivative, being an odorless, light-gold-colored oil having a specific gravity of 0.92 and a Saybolt viscosity at 100° F. of about 155 seconds, used as a softener and processing aid), 8.0 parts; Micronex (a proprietary carbon black), 40.0 parts; P-33 (a proprietary soft reinforcing carbon black), 25.0 parts; extra light calcined magnesium oxide, 4.0 parts; Agerite Stalite (a proprietary antioxidant, being a mixture of mono- and di-heptyldiphenylamines), 2.0 parts; and zinc oxide, 7.5 parts. The foregoing ingredients, with the exception of the zinc oxide, were mixed in a Banbury mixer to provide a master batch. This master batch was then divided into various portions, and these portions were then mixed on a mill with an amount of zinc oxide conforming to the preceding formula. At the time the zinc oxide was mixed into the various portions, zinc dimethyl dithiocarbamate or a mixture of zinc dimethyl dithiocarbamate and the zinc salt of 2-mercaptobenzothiazole, was also mixed in. The finished portions of the master batch were vulcanized in a steam heated press at 307° F. for 20 minutes.

The mixture of zinc dimethyl dithiocarbamate and the zinc salt of 2-mercaptobenzothiazole employed was prepared as follows, the parts again being by weight:

To 520 parts of a 30 percent by weight aqueous solution composed of 364 parts of water and 156 parts of a mixture of the sodium salt of 2-mercaptobenzothiazole and the sodium salt of dimethyl dithiocarbamic acid, the weight ratio of the two sodium salts being 2.25:27.75, respectively, there was added 100 parts of $ZnSO_4.H_2O$ and 1.6 parts of concentrated sulfuric acid. From the reaction mixture there precipitated 161 parts of a mixture of the zinc salt of 2-mercaptobenzothiazole and zinc dimethyl dithiocarbamate. This precipitate was thereafter separated and dried.

The various samples of vulcanized chloroprene prepared were then subjected to a test known as U. S. Army Specification No. 60–977–2. That test involves the use of two different organisms, one of which is *Aspergillus niger*, U. S. D. A. No. 6275 and the other of which is the organism *Penicillium cirtrinum*, American Type Culture Collection No. 9849. Briefly, the test involves subjecting the specimen to a temperature of 185° F. for twenty-four hours, and then immersing it in slowly running water for twenty-four hours at 77° F., the water having a pH of 6.5 to 7.5 and not falling directly on the specimen. The specimen is then removed from the water and excess water shaken off, after which the specimen is placed on hardened agar in a Petri dish and inoculated with test organisms. The Petri dish containing the agar and specimen is incubated at a temperature of 82° F. to 86° F. and a relative humidity of 85 to 95 percent. When the various portions of vulcanized chloroprene were tested in accordance with this procedure, the results were as follows:

*Evidence of growth on samples*

| Sample | 14 Days | | 28 Days | | 35 Days | |
|---|---|---|---|---|---|---|
| | A. niger | Pen. sp. | A. niger | Pen. sp. | A. niger | Pen. sp. |
| Control (no zinc salt used) | ++ | ++ | ++ | ++ | +++ | +++ |
| 0.5% Zinc dimethyl dithiocarbamate | + | + | ++ | ++ | ++ | ++ |
| 0.5% mixture of zinc salts | 0 | 0 | + | + | + | + |
| 0.75% Zinc dimethyl dithiocarbamate | + | + | ++ | ++ | ++ | ++ |
| 0.75% Mixture of zinc salts | 0 | 0 | 0 | 0 | 0 | 0 |
| 1.0% Zinc dimethyl ditiocarbamate | Trace | Trace | + | + | + | + |
| 1.0% Mixture of zinc salts | 0 | 0 | 0 | 0 | 0 | 0 |
| 1.5% Zinc dimethyl dithiocarbamate | 0 | 0 | 0 | 0 | + | + |
| 1.5% Mixture of zinc salts | 0 | 0 | 0 | 0 | 0 | 0 |
| 2.0% Zinc dimethyl dithiocarbamate | 0 | 0 | 0 | 0 | 0 | 0 |
| 2.0% Mixture of zinc salts | 0 | 0 | 0 | 0 | 0 | 0 |

In the preceding table, the percentages of zinc dimethyl-dithiocarbamate and the percentages of the mixture of zinc salts (zinc dimethyl dithiocarbamate and the zinc salt of 2-mercaptobenzothiazole) are by weight and are based upon the weight of Neoprene GN present in the sample. The symbols +, ++ and +++ indicate, respectively, light growth, medium growth and heavy growth. The symbol 0 indicates that no growth occurred during the period indicated.

The method of our invention can be employed in conjunction with the methods conventionally used by the art in vulcanizing chloroprene. When chloroprene is vulcanized the rubber generally has in admixture with it plasticizers and processing aids, fillers, stabilizers, antioxidants and accelerators. Among the plasticizers and processing aids which can be used are various petroleum oils, low temperature plasticizers, hydrocarbon polymers and 2-mercaptobenzothiazole and derivatives thereof. For example, in addition to the plasticizers and processing aids disclosed in the specific example there can be used Bondogen (a proprietary product, consisting of 75 percent of sulfonated petroleum product and 25 percent of n-butyl alcohol, Reogen (a proprietary product, composed of 80 percent of mineral oil, 15 percent of sulfonated petroleum product and 5 percent of n-butyl alcohol), Plastogen (a proprietary product composed of 98 precent of mineral oil, 1.6 percent of sulfonated petroleum product and 0.4 percent of n-butyl alcohol), dioctyl adipate, dioctyl sebacate, trioctyl phosphate and the like. Among the fillers which can be used in addition to carbon black are mineral fillers, such as clays or pyrophyllite, and inert fillers, such as wood flour. Conventional antioxidants can be used, such as hydroquinone monobenzyl ether; ditolylamines; mixtures of phenyl-beta-naphthylamine, isopropoxydiphenylamine and diphenyl - para-phenylenediamine; phenyl-beta-naphthylamine; adol-alpha-naphthylamine; polymerized trimethyl dihydroquinone; symmetrical di - beta - naphthyl - para-phenylenediamine and the like. Litharge, as well as zinc oxide, can be used as an accelerator.

The method of our invention can be employed in the vulcanization of other types of chloroprene rubber in addition to Neoprene GN. For example, our invention is useful in the vulcanization of Neoprene GRT (a proprietary sulfur-modified chloroprene polymer stabilized by a thiuram disulfide and containing a non-discoloring antioxidant), GN-A (a proprietary sulfur-modified chloroprene polymer stabilized by a thiuram disulfide and containing a secondary aromatic amine stabilizer) and WRT (a proprietary stabilized chloroprene polymer which contains no sulfur, thiuram disulfide, or other compounds capable of decomposing to yield either free sulfur or a vulcanization accelerator). A typical formula for the vulcanization of Neoprene W in accordance with our invention is as follows, the parts being by weight: Neoprene W (a proprietary stabilized chloroprene polymer containing no sulfur, thiuram disulfide, or other compound capable of decomposing to liberate free sulfur or form vulcanization accelerators), 100 parts; magnesia, 2 parts; Neozone A (a proprietary phenyl-alpha-naphthylamine antioxidant), 2 parts; carbon black, 58 parts; stearic acid, 0.5 part; dioctyl adipate, 20 parts; zinc oxide, 5 parts; NA–22 (a proprietary 2-mercaptoimidazoline composition), 0.35 part; and mixture of zinc salts according to the example, 1.5 parts. The mixture is milled in the conventional manner and then cured at 300° F. for 20 minutes.

The amount of the mixture of zinc dimethyl dithiocarbamate and the zinc salt of 2-mercaptobenzothiazole employed in accordance with our invention can be varied somewhat, depending upon the degree of resistance to fungus attack desired in the final product. In general, the mixture of zinc salts will amount to from about 0.5 to 3 percent by weight, based upon the weight of the chloroprene, and preferably from about 1 to 2 percent. The relative amounts of zinc dimethyl dithiocarbamate and the zinc salt of 2-mercaptobenzothiazole present in the mixture of zinc salts can also be varied. For example, the weight ratio of zinc dimethyl dithiocarbamate to the zinc salt of 2-mercaptobenzothiazole can be 98:2, 95:5 or 93:7. In general, the ratio will be within the range from 99:1 to 90:10.

We claim:

1. In the vulcanization of chloroprene rubber, the step of incorporating into the rubber a mixture of zinc salts consisting essentially of zinc dimethyl dithiocarbamate and the zinc salt of 2-mercaptobenzothiazole in a weight ratio of from 99:1 to 90:10, the amount of said mixture being sufficient to impart resistance to fungus attack to the chloroprene rubber when vulcanized.

2. A method according to claim 1 in which the amount of said mixture employed is within the range from about 1 to 2 percent, based upon the weight of the chloroprene.

References Cited in the file of this patent

UNITED STATES PATENTS

| 2,243,544 | ter Hoist | May 27, 1941 |
| 2,414,391 | Peaker | Jan. 14, 1947 |

OTHER REFERENCES

Du Pont: "Rubber Chemicals Colors and Neoprenes," Report No. 50–2, August 1950, published by Rubber Chemicals Division, E. I. du Pont de Nemours & Co., Wilmington 98, Del., page 29.